US012365558B2

(12) United States Patent
Mizuguchi

(10) Patent No.: US 12,365,558 B2
(45) Date of Patent: Jul. 22, 2025

(54) IMAGE FORMING APPARATUS

(71) Applicant: CANON KABUSHIKI KAISHA, Tokyo (JP)

(72) Inventor: Kohei Mizuguchi, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 65 days.

(21) Appl. No.: 17/035,824

(22) Filed: Sep. 29, 2020

(65) Prior Publication Data

US 2021/0101768 A1 Apr. 8, 2021

(30) Foreign Application Priority Data

Oct. 7, 2019 (JP) ................................ 2019-184744

(51) Int. Cl.

*B65H 31/10* (2006.01)
*G03G 15/00* (2006.01)
*B65H 31/04* (2006.01)
*B65H 31/08* (2006.01)

(52) U.S. Cl.

CPC ......... *B65H 31/10* (2013.01); *G03G 15/6547* (2013.01); *B65H 31/04* (2013.01); *B65H 31/08* (2013.01); *B65H 2405/11161* (2013.01)

(58) Field of Classification Search

CPC ........ B65H 31/10; B65H 31/08; B65H 31/04; B65H 31/14; B65H 2405/11161; B65H 2405/11162; B65H 2405/1117; B65H 2405/1412; B65H 2405/11151;

(Continued)

(56) References Cited

U.S. PATENT DOCUMENTS 8,991,818 B2 3/2015 Kozaki
9,075,391 B2 * 7/2015 Ono .................. G03G 15/6552
9,162,840 B1 10/2015 Ohta (Continued)

FOREIGN PATENT DOCUMENTS

CN 103848240 A 6/2014
CN 104944201 A 9/2015

(Continued)

OTHER PUBLICATIONS

Feb. 4, 2023 Chinese Official Action in Chinese Patent Appln. No. 202011060175.3.

(Continued)

*Primary Examiner* — Stephen D Meier
*Assistant Examiner* — Quang X Nguyen
(74) *Attorney, Agent, or Firm* — Venable LLP

(57) ABSTRACT

An image forming apparatus includes an image forming portion, a sheet discharging portion, and a sheet stacking portion. The stacking portion includes a first member including an inclined surface inclined upward toward a downstream side of a sheet discharging direction, and a second member including a stacking surface which projects upward from the inclined surface and on which the discharged sheet is stacked. The second member is rotatable relative to the first member about a supporting point provided upstream of the stacking surface with respect to the sheet discharging direction. The second member is rotatable about the supporting point in a direction in which the stacking surface moves downward in accordance with an increase in number of sheets stacked on the stacking surface.

32 Claims, 10 Drawing Sheets

(58) Field of Classification Search
CPC ..... G03G 15/6547; G03G 2215/00421; G03G 15/6552; G03G 15/65
See application file for complete search history.

(56) References Cited

U.S. PATENT DOCUMENTS

| | | | | |
|---|---|---|---|---|
| 9,417,586 | B2 * | 8/2016 | Izumichi | G03G 15/6573 |
| 9,592,992 | B2 | 3/2017 | Mizuguchi et al. | |
| 9,829,849 | B2 | 11/2017 | Maruta | |
| 9,950,885 | B2 | 4/2018 | Mizuguchi | |
| 2009/0189344 | A1 | 7/2009 | Suzuki | |
| 2014/0151952 | A1 | 6/2014 | Kozaki | |
| 2014/0321877 | A1 | 10/2014 | Ono | |
| 2015/0248098 | A1 | 9/2015 | Izumichi | |
| 2015/0274475 | A1 | 10/2015 | Ohta | |
| 2016/0274537 | A1 * | 9/2016 | Yamashita | G03G 21/206 |
| 2017/0102660 | A1 | 4/2017 | Maruta | |
| 2017/0107072 | A1 * | 4/2017 | Nakamura | B65H 31/02 |
| 2017/0108815 | A1 * | 4/2017 | Yoneda | B65H 29/52 |
| 2018/0170701 | A1 | 6/2018 | Mizuguchi | |
| 2018/0339872 | A1 | 11/2018 | Mizuguchi | |
| 2021/0101768 | A1 | 4/2021 | Mizuguchi | |

FOREIGN PATENT DOCUMENTS

| | | | | |
|---|---|---|---|---|
| JP | S58-144045 | A | | 8/1983 |
| JP | 2000038247 | A | * | 2/2000 |
| JP | 2000118841 | A | * | 4/2000 |
| JP | 2000-238955 | A | | 9/2000 |
| JP | 2002-087682 | A | | 3/2002 |
| JP | 2002128372 | A | * | 5/2002 |
| JP | 2004226793 | A | * | 8/2004 |
| JP | 2007-112581 | A | | 5/2007 |
| JP | 2007-197142 | A | | 8/2007 |
| JP | 2011184159 | A | * | 9/2011 |
| JP | 2014-215456 | A | | 11/2014 |
| JP | 2015-160733 | A | | 9/2015 |
| JP | 2017071501 | A | | 4/2017 |
| JP | 2018-007166 | A | | 1/2018 |
| JP | 2021-059431 | A | | 4/2021 |

OTHER PUBLICATIONS

Jul. 25, 2023 Japanese Official Action in Japanese Patent Appln. No. 2019-184744.

Dec. 26, 2023 Japanese Official Action in Japanese Patent Appln. No. 2019-184744.

May 21, 2024 Japanese Official Action in Japanese Patent Appln. No. 2023-118550.

Dec. 9, 2024 Chinese Official Action in Chinese Patent Appln. No. 202011060175.3.

Apr. 15, 2025 Japanese Official Action in Japanese Patent Appln. No. 2024-115761.

* cited by examiner

IMAGE FORMING APPARATUS

FIELD OF THE INVENTION AND RELATED ART

The present invention relates to an image forming apparatus for forming an image on a sheet.

In the image forming apparatus such as a printer, a copying machine or a multi-function machine, the sheet on which the image is formed by an electrophotographic mechanism or a printing unit of an ink jet type is stacked on a discharge tray by a discharging roller pair.

Japanese Laid-Open Patent Application 2000-38247 discloses an image forming apparatus in which a rib guide which projects upward from the discharge tray and on which sheets are to be stacked is provided. The rib guide lowers depending on a stacked sheet number of the sheets stacked thereon.

The rib guide rotates about a downstream end portion, as a supporting point, thereof with respect to a sheet discharging direction. An inclination angle of the rib guide relative to a horizontal surface becomes larger as the stacked sheet number of the sheets stacked on the rib guide increases and thus the rib guide lowers. As a result, a sheet newly discharged in a state in which the stacked sheet number of the sheets on the rib guide is large is susceptible to a large feeding resistance from the sheets which have already been stacked on the rib guide during discharge thereof by the discharging roller pair. The newly discharged sheet is subjected to the large sheet resistance from the already stacked sheets, whereby a positional deviation of the newly discharged sheet is liable to occur. Therefore, there is a liability that an aligning property of the stacked sheets becomes poor.

SUMMARY OF THE INVENTION

A principal object of the present invention is to provide an image forming apparatus in which even when a stacked sheet number of sheets becomes large, an aligning property of the sheets stacked is good.

According to an aspect of the present invention, there is provided an image forming apparatus comprising: an image forming portion configured to form an image on a sheet; a discharging portion configured to discharge the sheet on which the image is formed by the image forming portion; and a stacking portion configured to stack the sheet discharged by the discharging portion in a state in which an upstream end of the sheet with respect to a sheet discharging direction is lower than a downstream end of the sheet with respect to the sheet discharging direction, wherein the stacking portion includes: a first member including an inclined surface inclined upward toward a downstream side of the sheet discharging direction; and a second member including a stacking surface which projects upward from the inclined surface and on which the discharged sheet is stacked, wherein the second member is rotatable relative to the first member about a supporting point provided upstream of the stacking surface with respect to the sheet discharging direction; and wherein the second member is rotatable about the supporting point in a direction in which the stacking surface moves downward in accordance with an increase in number of sheets stacked on the stacking surface.

Further features of the present invention will become apparent from the following description of exemplary embodiments with reference to the attached drawings.

DESCRIPTION OF THE EMBODIMENTS

In the following exemplary embodiments for carrying out the present invention will be described while making reference to the drawings.

Figure 1:
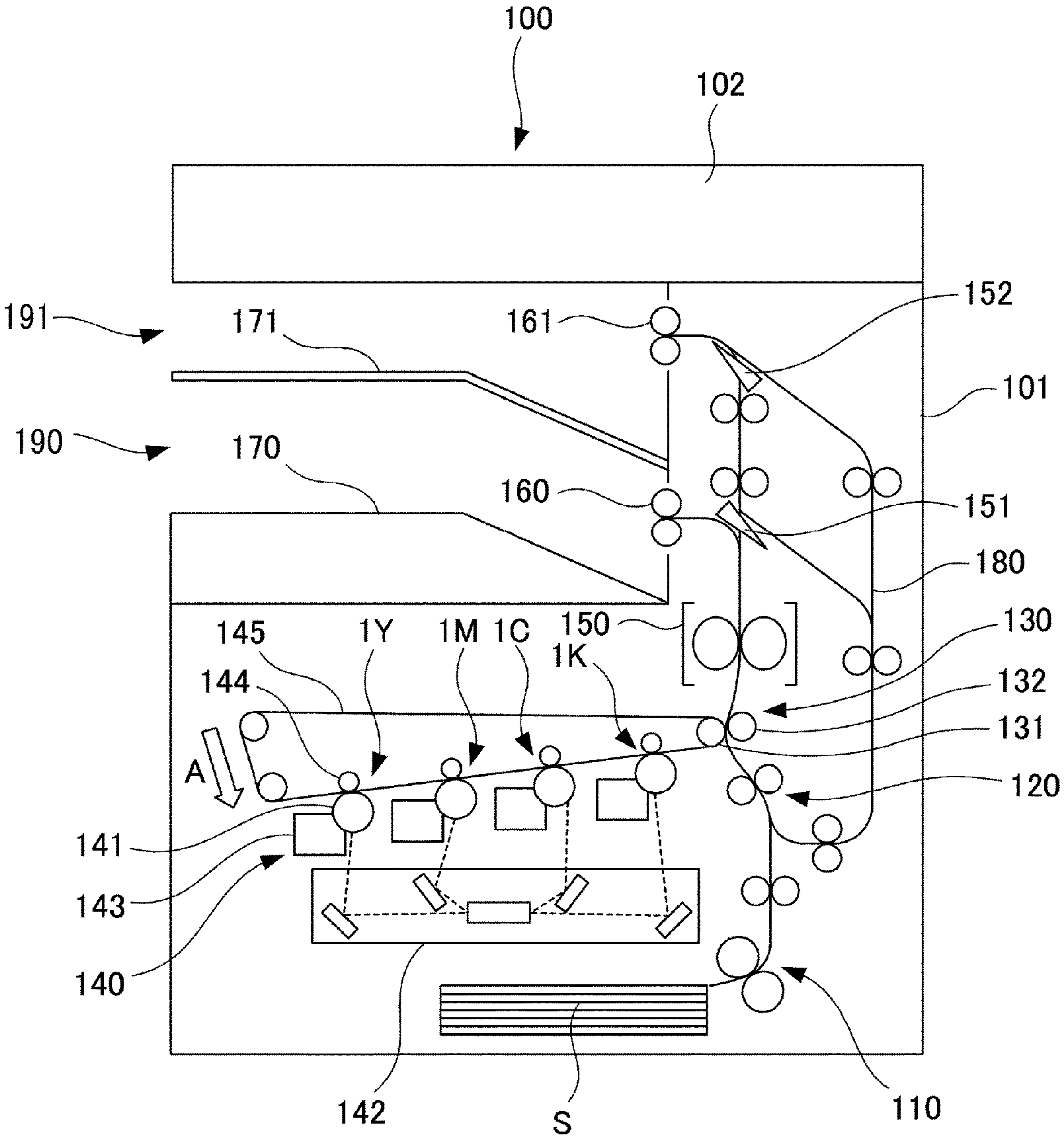
FIG. 1 is a schematic view of an image forming apparatus according to an embodiment 1.

FIG. 1 is a schematic view of an image forming apparatus 100 according to an embodiment 1. An apparatus main assembly 101 of the image forming apparatus 100 accommodates an image forming portion 140 as an electrophotographic mechanism of an intermediary transfer tandem type in which four image forming stations 1Y, 1M, 1C and 1K for forming four color toner images are provided along an intermediary transfer belt 145.

In each of the image forming stations 1Y, 1M, 1C and 1K, the toner image is formed by an electrophotographic process. That is, a photosensitive member 141 which is an image bearing member is electrically charged uniformly in advance by a charger, and thereafter is subjected to scanning exposure to light emitted from an exposure device 142, so that an electrostatic latent image is written (formed) on a surface of the photosensitive member 141. This electrostatic latent image is developed as the toner image by charged toner particles supplied from a developing device 143. The toner image carried on the photosensitive member 141 is temporarily transferred onto the intermediary transfer belt 145 as an intermediary transfer member by a primary transfer roller 144. At this time, the toner images for yellow, magenta, cyan and black formed by the respective image forming stations 1Y, 1M, 1C and 1K are superposed on the intermediary transfer belt 145, so that a full-color toner image is formed. This full-color toner image is carried on the intermediary transfer belt 145 and is fed to a secondary transfer portion 130.

In parallel to such a process of image formation, a feeding process of a sheet S which is a recording material is carried out. The sheet Sis accommodated in a cassette capable of being inserted into and pulled out of the apparatus main assembly 101 of the image forming apparatus 100 in a state in which the sheet Sis stacked on a lift-up device included in a sheet feeding device. Incidentally, as the sheet S, it is possible to use various sheet materials, different in size and material, such as paper including plain paper, thick paper and the like, a plastic film, a cloth, a surface-treatment sheet material such as coated paper, and a special-shaped sheet material such as an envelope or index paper. The sheets S accommodated in the cassette are fed one by one on the basis of progression of the image forming operation by the image forming stations 1Y, 1M, 1C and 1K, by a feeding unit 110 as a feeding means.

The sheet S fed by the feeding unit 110 is conveyed to an oblique movement correcting device 120 through a conveying passage and is subjected to oblique movement correction and timing correction in the oblique movement correction device 120, and thereafter is sent to the secondary transfer portion 130. The secondary transfer portion 130 is a nip formed by an inner secondary transfer roller 131 and an outer secondary transfer roller 132 which oppose each other while sandwiching the intermediary transfer belt 145 therebetween. The toner image carried on the intermediary transfer belt 145 is transferred onto the sheet S under application of a mechanical pressing force and an electrostatic load bias at the secondary transfer portion 130.

The sheet S passed through the secondary transfer portion 130 is conveyed to a fixing device 150. The fixing device 150 includes a rotatable member pair rotatable while nipping the sheet S and a heat source such as a halogen lamp, and heats and presses the toner image on the sheet S while feeding the sheet S. By this, the toner particles are melted and thereafter are fixed, so that the toner image is fixed on the sheet S. The sheet S on which a fixed image is obtained is guided by a first flap 151 which is a switching member to a passage (lower discharge path) toward a first discharging roller 160 or to a passage (upper discharge path) toward a second discharging roller 161.

The image forming apparatus 100 of this embodiment is provided with a first discharge tray 170 and a second discharge tray 171, as discharge designations of the image-formed sheet S. The sheet S guided to the lower discharge path is discharged to an outside of the apparatus main assembly 101 by the first discharging roller 160 and is stacked on the first discharge tray 170. The sheet S guided to the upper discharge path is discharged to an outside of the apparatus main assembly 101 by the second discharging roller 161 and is stacked on the second discharge tray 171. The first discharging roller 160 and the first discharge tray 170 constitute a first discharging portion 190, and the second discharging roller 161 and the second discharge tray 171 constitute a second discharging portion 191. Each of the first discharging portion 190 and the second discharging portion 191 is an example of a sheet discharging device for discharging the sheet S.

On the other hand, in the case where double-side printing is carried out, the sheet S on which image formation on a first surface is effected is guided to the upper discharge path by the first flap 151, and thereafter is subjected to switch-back feeding by a reversing operation of the second discharging roller 161. A second flap 152 guides the sheet S after being switched back, to a double-side feeding path 180. Then, the sheet S reached again the oblique movement correcting device 120 through the double-side feeding path 180 is subjected to image formation on a second surface by a process similar to the process for the first surface, and thereafter is discharged on the first discharge tray 170 or the second discharge tray 171.

Incidentally, each of the first discharge tray 170 and the second discharge tray 171 includes an inclined surface inclined upward with respect to a vertical direction toward a downstream side with respect to a discharging direction (leftward direction in the figure). For that reason, the sheet S discharged on each discharge tray is returned to an upstream side with respect to the discharging direction by a self-weight thereof, and is aligned in contact with an alignment reference wall provided on the apparatus main assembly 101.

Further, the image forming apparatus 100 of this embodiment has a constitution of a so-called in-body discharge type in which a sheet discharging space is provided between an image reading apparatus 102, provided at an upper portion of the apparatus main assembly 101 with respect to the vertical direction, and the image forming portion 140. Of the first discharge tray 170 and the second discharge tray 171 which are provided in upper and lower two stages in this discharging space, the first discharge tray 170 in the lower stage is mounted at an upper portion of the apparatus main assembly 101. Incidentally, the image reading apparatus 102 is an apparatus which reads image information by scanning an original by an image sensor unit provided with a pick-up element and which transfers the image information to a control circuit of the apparatus main assembly 101.

[Discharging Tray]

In the following, a first discharging portion 190 which is the sheet feeding device will be described. In the following description, description will be made by simply referring to the first discharge tray 170 and the first discharging roller 160 as a "discharge tray 170" and a "discharging roller 160", respectively. Further, a movement direction of the sheet discharged from the discharging roller 160 with respect to the horizontal direction is referred to as a "sheet discharging direction D1", and an axial direction (direction perpendicular to the vertical direction and the sheet discharging direction D1) of the discharging roller 160 is referred to as a "widthwise direction D2".

Figure 2:
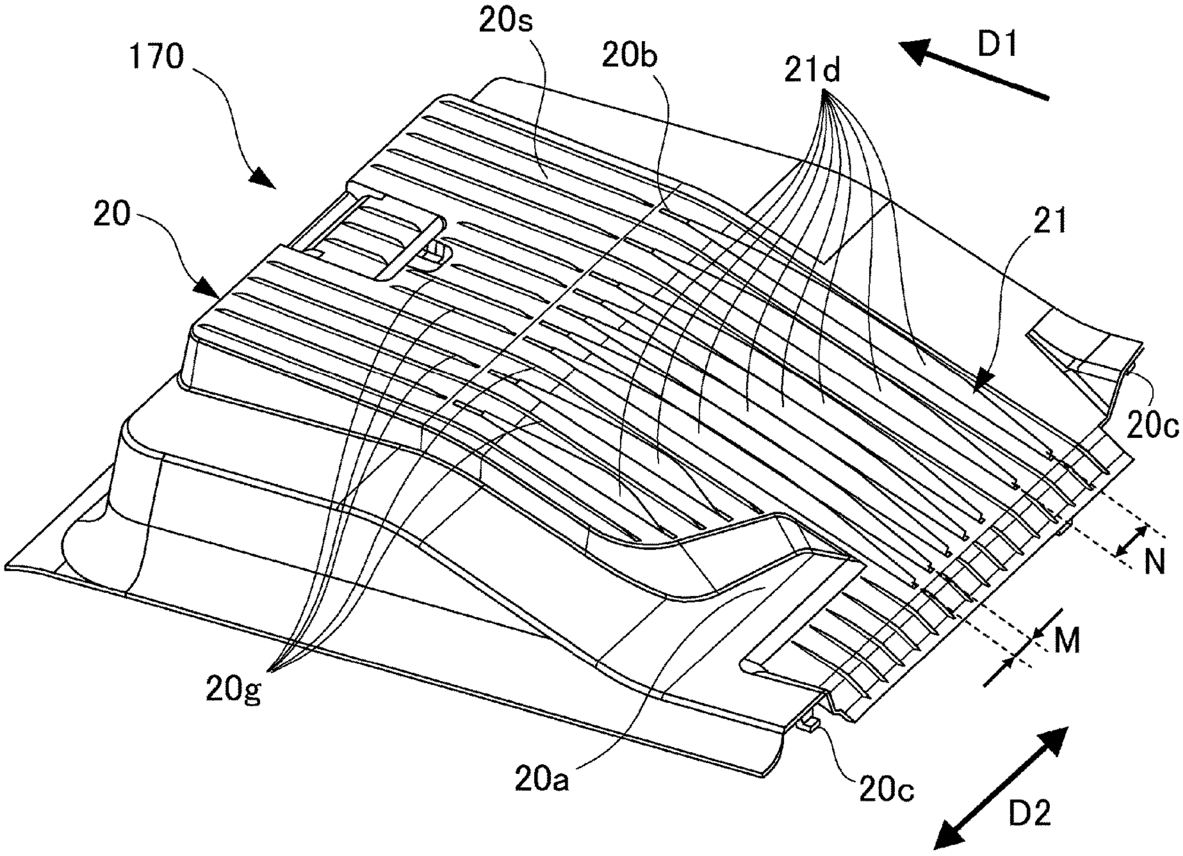
FIG. 2 is a perspective view of a discharge tray (first discharge tray) on an upper (front) surface side in the embodiment 1.
Figure 3:
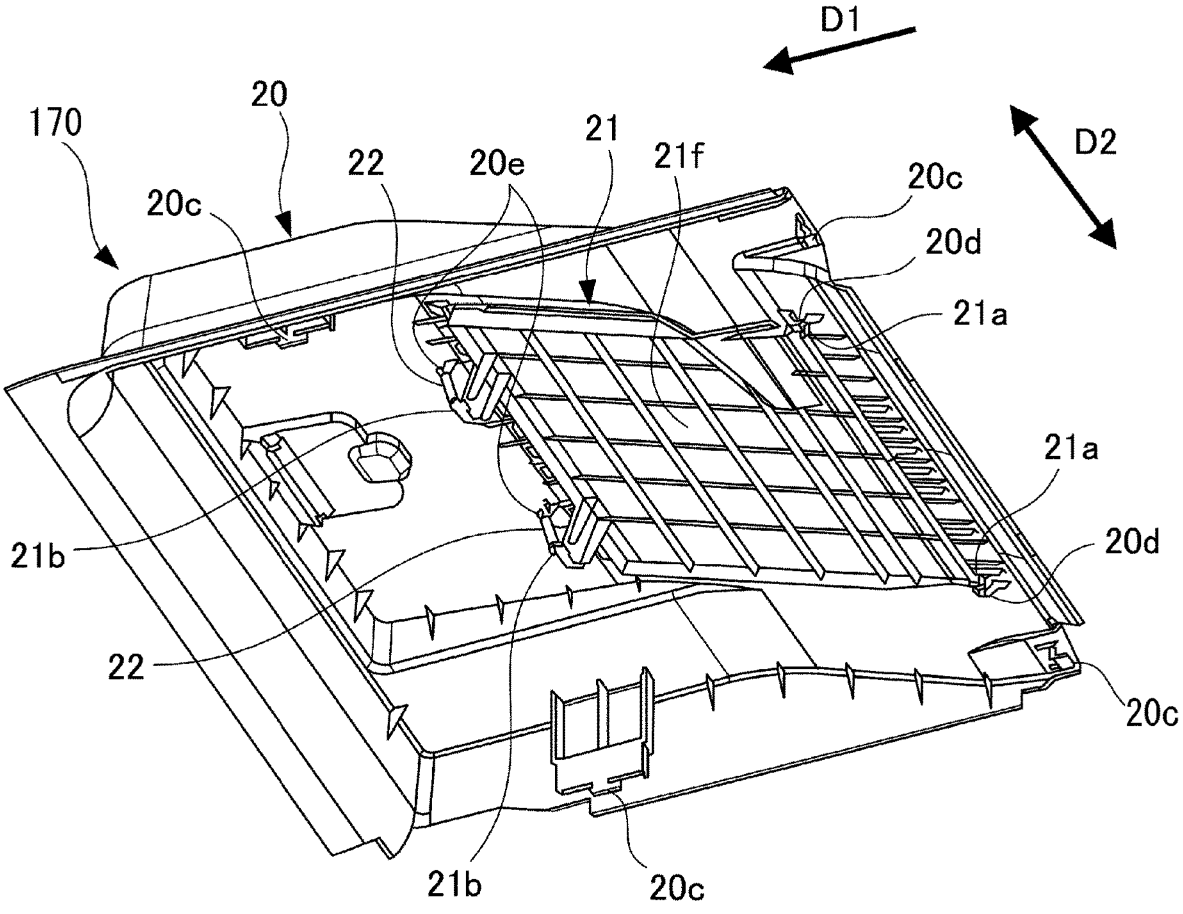
FIG. 3 is a perspective view of the discharge tray (first discharge tray) on a lower (back) surface side in the embodiment 1.

FIG. 2 is a perspective view of the discharge tray 170 as seen from an upper side (front side), and FIG. 3 is a perspective view of the discharge tray 170 as seen from a lower surface (back side). The discharge tray 170 which is a stacking portion in this embodiment is a tray unit including a fixing tray 20 as a first member forming a first stacking surface and a movable tray 21 as a second member forming a second surface and movable relative to a fixing member. The sheet S discharged by the discharging roller 160 is stacked on these fixing tray 20 and movable tray 21.

On a front side (FIG. 2) of the fixing tray 20, an upper surface 20*s* constituting the first stacking surface and a plurality of slits 20*b* arranged in the widthwise direction D2 from an upstream-side end portion toward a central portion with respect to the sheet discharging direction D1 are provided. As described later, from the respective slits 20*b* provided in the upper surface 20*s*, arcuate ribs 21*d* of the movable tray 21 project. Incidentally, on the upper surface 20*s*, at positions corresponding to the respective slits 20*b* with respect to the widthwise direction D2, a plurality of guiding ribs 20*g* extend in the sheet discharging direction D1. That is, the arcuate ribs 21*d* of the movable tray 21 and the guiding ribs 20*g* of the fixing tray 20 are arranged in the sheet discharging direction D1.

On a back side (FIG. 3) of the fixing tray 20, rotation holes 20*d* are provided at an upstream-side end portion with respect to the sheet discharging direction, and two fixing tray hooks 20*e* on which urging springs 22 are mounted are provided at a central portion with respect to the sheet discharging direction. Further, the fixing tray 20 is mounted on the image forming apparatus by engaging four mounting portions 20*c* with portions-to-be-engaged of the apparatus main assembly 101 (FIG. 1) and is fixed on the apparatus main assembly 101.

The movable tray 21 is provided with the plurality of arcuate ribs 21*d* (FIG. 2) forming a second stacking surface.

The plurality of arcuate ribs 21*d* are provided at positions corresponding to the slits 20*b* of the fixing tray 20 with respect to the widthwise direction D2, and at least a part thereof extends from the upstream-side end portion toward a downstream-side end portion of the movable tray 21 with respect to the sheet discharging direction D1. Further, an upper end portion of each arcuate rib 21*d* is inclined upward toward a downstream side of the sheet discharging direction D1 and is curved in a substantially arcuate shape so that an inclination angle thereof relative to the horizontal surface becomes small toward the downstream side of the sheet discharging direction D1. Incidentally, 9 arcuate ribs 21*d* are disposed in this embodiment. A distance (interval) M between adjacent arcuate ribs 21*d* of 5 central arcuate ribs 21*d* with respect to the widthwise direction is narrower than a distance (interval) N between adjacent (two) arcuate ribs 21*d* on each of opposite sides with respect to the widthwise direction.

Further, the movable tray 21 includes, on the back side (FIG. 3) of the fixing tray 20, a plate-like main body portion 21*f* connecting the plurality of arcuate ribs 21*d*, two rotation shafts 21*a* which are rotation supporting points of the movable tray 21, and two movable tray hook portions 21*b*. Each of the arcuate ribs 21*d* extends upward from the main body portion 21*f* with respect to the vertical direction and is capable of projecting upward from the fixing tray 20 through the slits 20*b* of the fixing tray 20.

The two rotation shafts 21*a* are provided at the upstream-side end portion of the movable tray 21 with respect to the sheet discharging direction D1 and engage in the rotation holes 20*d* of the fixing tray 20, respectively. By this, the movable tray 21 is constituted so as to be rotatable relative to the fixing tray 20 about a rotational axis extending in the widthwise direction D2 (i.e., a phantom rectilinear line passing through the two rotation shafts 21*a*). The two tray hook portions 21*b* are provided at the downstream-side end portion of the movable tray 21 with respect to the sheet discharging direction D1. Between each of two sets of the movable tray hook portions 21*b* and the fixing tray hook portions 20*e*, the urging spring 22 is mounted and urges the movable tray hook portion 21*b* to approach the fixing tray hook portion 20*e* (i.e., urges the movable tray 21 upward). Incidentally, at the downstream-side end portion of the movable tray 21 with respect to the sheet discharging direction D1, an abutment portion 21*c* (FIGS. 4 and 5) contactable to the back surface of the fixing tray 20 is provided. A position (FIG. 4) where the abutment portion 21*c* contacts the fixing tray 20 is an upper-limit position of a rotation range of the movable tray 21.

The discharge tray 170 assembled as described above is mounted on the apparatus main assembly 101 by the four mounting portions 20*c* of the fixing tray 20. Incidentally, the discharge tray 170 (and the second discharge tray 171 positioned above the discharge tray 160) are mountable in and dismountable from the apparatus main assembly 101, and by removing both the discharge trays from the apparatus main assembly 101, a space for mounting a post-processing device is ensured in an in-body discharging space of the image forming apparatus 100.

[Details of Tray Shape]

Figure 4:
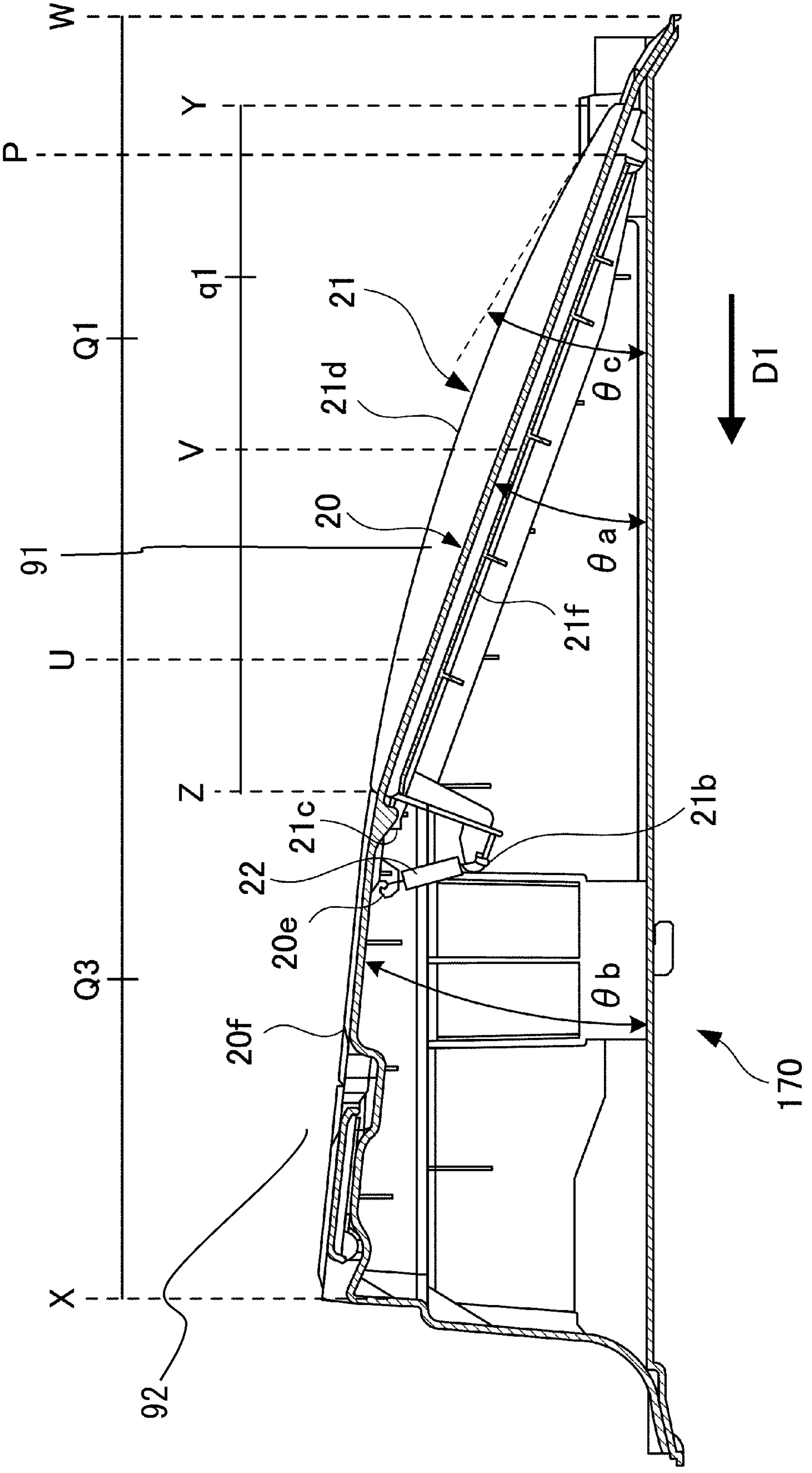
FIG. 4 is a sectional view of the discharge tray in the embodiment 1 (stand-by state).
Figure 5:
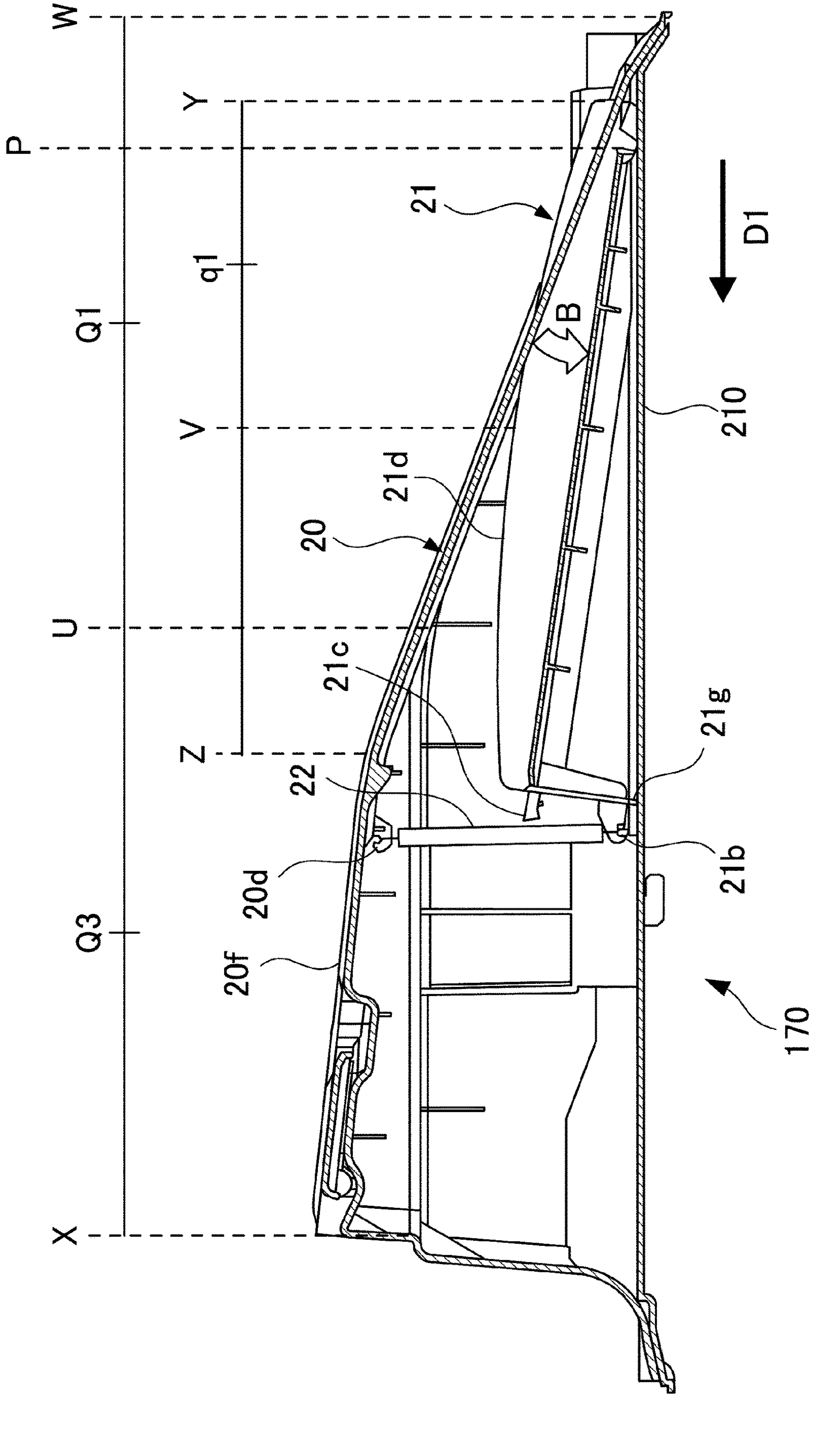
FIG. 5 is a sectional view of the discharge tray in the embodiment 1 (full-stacked state).

Next, a shape and an operation of the stacking surface formed by the discharge tray 170 including the movable tray 21 will be described. FIG. 4 is a sectional view of the discharge tray 170 when the movable tray 21 is in a stand-by state, and FIG. 5 is a sectional view of the discharge tray 170 when the movable tray 21 is in a maximum rotation state. However, the stand-by state refers to a state in which no sheet is stacked on the discharge tray 170, and the maximum rotation state refers to a state in which the movable tray 21 most rotates downward from a position of the stand-by state thereof. The position of the movable tray 21 in the stand-by state is a first position in this embodiment, and a position of the movable tray 21 in the maximum rotation state is a second position in this embodiment. Further, in the following description, "upstream" or "downstream" represents a positional relationship on the upstream side or the downstream side with respect to the sheet discharging direction D1.

A first stacking surface WX is a surface formed from a position W to a position X by the fixing tray 20. The position W is a position of an upstream end with respect to the sheet discharging direction D1 in a region in which the fixing tray 20 is capable supporting a lower surface of the sheet by an upper surface thereof, and the position X is a position of a downstream end with respect to the sheet discharging direction D1 in the region.

A second stacking surface YZ is a surface formed from a position Y to a position Z by the arcuate ribs 21*d* of the movable tray 21. That is, the second stacking surface YZ in this embodiment is a phantom surface connecting upper end portions of the plurality of arcuate ribs, arranged in the widthwise direction, in the widthwise direction. The position Y is a position of an upstream end with respect to the sheet discharging direction D1 in a region in which the arcuate ribs 21*d* are capable of supporting the lower surface of the sheet, and the position Z is a position of a downstream end with respect to the sheet discharging direction D1 in the region.

The movable tray 21 is disposed by being shifted toward the upstream side of the discharge tray 170 with respect to the sheet discharging direction D1. For example, an intermediary position V (a midpoint between the position Y and the position Z) of the second stacking surface with respect to the sheet discharging direction D1 is positioned upstream of an intermediary position U (a midpoint between the position W and the position X) of the first stacking surface which is also an intermediary position of the entirety of the discharge tray 170. A distance from the upstream end of the first stacking surface WX to the upstream end of the second stacking surface YZ is shorter than a distance from the downstream end of the first stacking surface WX to the downstream end of the second stacking surface YZ (WY<XZ).

The upstream end (Y) of the second stacking surface YZ is positioned in the upstream-side end region of the discharge tray 170. For example, the upstream end (Y) of the second stacking surface YZ is positioned upstream of an upstream-side quadrisection point θ1 when a range of the stacking surface of the discharge tray 170 with respect to the sheet discharging direction D1 is divided into four equal parts. On the other hand, the downstream end (Z) of the second stacking surface YZ extends to a side downstream of the intermediary position U of the discharge tray 170 with respect to the sheet discharging direction D1. However, the downstream end (Z) of the second stacking surface YZ is positioned upstream of a downstream-side quadrisection point Q3 when the range of the stacking surface of the discharge tray 170 with respect to the sheet discharging direction D1 is divided into the four equal parts.

A rotation supporting point P of the movable tray 21 is provided in the neighborhood of the upstream-side end portion of the discharge tray 170. Specifically, the rotation supporting point P is positioned upstream of the intermediary position U of the discharge tray 170 with respect to the sheet discharging direction D1, and a distance from the rotation supporting point P to the position W is smaller than a distance from the rotation supporting point P to the intermediary position U. In other words, the rotation supporting point P is positioned on a side upstream of the upstream-side quadrisection point Q1 of the stacking surface of the discharge tray 170 with respect to the sheet discharging direction D1.

Further, the rotation supporting point P of the movable tray 21 is provided in the neighborhood of an upstream-side end portion of the movable tray 21 itself. Specifically, the rotation supporting point P is positioned upstream of the intermediary position V of the movable tray 21 with respect to the sheet discharging direction D1, and a distance from the rotation supporting point P to the position Y is smaller than a distance from the rotation supporting point P to the intermediary position V. In other words, the rotation supporting point P is positioned on a side upstream of an upstream-side quadrisection point q1 of the second stacking surface of the movable tray 21 with respect to the sheet discharging direction D1 when a range of the second stacking surface is divided into four equal parts with respect to the sheet discharging direction D1.

Incidentally, in the illustrated constitution example, the rotation supporting point P of the movable tray 21 is provided at a position closer to the upstream end of the discharge tray 170 and the upstream end of the movable tray 21 itself in the above-described ranges. For example, a distance (PW) from the rotation supporting point P to the upstream end (W) of the discharge tray 170 with respect to the sheet discharging direction D1 is less than ⅛ of a range (WX) of the entirety of the stacking surface of the discharge tray 170. Further, a distance (PY) from the rotation supporting point P to the upstream end (Y) of the second stacking surface YZ with respect to the sheet discharging direction D1 is less than ⅛ of a range (YZ) of the entirety of the stacking surface of the discharge tray 170.

In the stand-by state, each of the first stacking surface WX and the second stacking surface YZ is constituted by an inclined surface inclined upward with respect to the vertical direction toward the downstream side with respect to the sheet discharging direction D1. That is, the fixing tray 20 and the movable tray 21 are inclined in the stand-by state so that a force for returning the sheet, discharged on the discharge tray 170, toward the upstream side with respect to the sheet discharging direction is generated.

Inclination angles of the first stacking surface WX and the second stacking surface YZ will be described specifically. The first stacking surface WZ is different in average inclination angle between a section 91 (W to Z) on a side upstream of the downstream end of the second stacking surface YZ and a section 92 (Z to X) on a side downstream of the downstream end of the second stacking surface YZ. When the inclination angle in the upstream section 91 (W to Z) of the first stacking surface WX is θa (degrees) and the inclination angle of the downstream section 92 (Z to X) of the first stacking surface WX is θb (degrees), θa>θb is satisfied. Incidentally, each of the upstream and downstream sections of the first stacking surface WX in this embodiment is formed in a planar shape inclined at a certain inclination angle θa or θb. Each of θa and θb in the case where the inclination angle in each section is not a certain angle refers to an average inclination angle.

The second stacking surface YZ is constituted so that the inclination angle of at least a portion upstream thereof is larger than the inclination angle θa in the section, upstream of the first stacking surface WX, where the second stacking surface YZ and the position of the sheet with respect to the sheet discharging direction D1 overlap with each other. That is, when an inclination angle of a tangential line of the arcuate rib 21*d* relative to the horizontal surface is θc (degrees), the inclination angle θc becomes gradually small from the upstream side toward the downstream side. At this time, a constitution is employed so that θc>θa is satisfied at least in the upstream-side end portion region of the second stacking surface YZ where the inclination angle θc becomes maximum. In other words, when the inclination angle θc of the second stacking surface YZ in the upstream-side end portion region of the second stacking surface YZ is θcmax, θcmax is a value larger than θc.

In the illustrated constitution example, setting such that θa=20 (degrees), θb=6 (degrees) and θcmax=32 (degrees) is made. However, the inclination angles of the stacking surfaces are not limited thereto, but may also be appropriately changeable depending on a material and a size of a principal sheet of which use is assumed, a surface property of a material constituting the discharge tray 170, and the like.

When no sheet is stacked on the discharge tray 170, the movable tray 21 is kept in the stand-by state in which the second stacking surface YZ most projects upward from the first stacking surface WX by an urging force of the urging spring. At this time, as shown in FIG. 4, the entirety of the second stacking surface YZ is positioned above the first stacking surface WX. The movable tray 21 rotates downstream as shown by an arrow B in FIG. 5 depending on a force from an upper direction, i.e., depending on a weight of the discharged sheet. The urging force of the urging spring 22 is set so that even when a small force is exerted, contact of the abutment portion 21*c* of the movable tray 21 to the fixing tray 21 is maintained and thus vibration noise does not easily generate.

On the other hand, the urging force of the urging spring 22 is set so that in a state in which sheets in a certain number or more are stacked to the discharge tray 170, the movable tray 21 is rotated to a maximum rotation state depending on the weight of the sheets. As described later, in a state in which the stacked sheet number is small, the second stacking surface YZ of which inclination degree is larger supports the sheets, so that a returning force acting on the sheets is larger and thus a higher aligning property is achieved. When a stacking amount of the sheets becomes large, a lower end portion 21*g* of the movable tray 21 contacts a mounting surface 210 of the apparatus main assembly 101, so that a downstream rotation of the movable tray 21 is restricted and thus the movable tray 21 is in the maximum rotation state. At this time, the urging spring 22 is in a most expanded state, but setting such that the expanded urging spring 22 does not fall within a plastic deformation range is made. By making such setting, even when the movable tray 21 is erroneously rotated artificially, a function of the urging spring 22 is not impaired. Further, in the maximum rotation state, the second stacking surface is retracted downstream from the first stacking surface at least in a range from the intermediary position V of the second stacking surface to the downstream end (Z).

As regards the movable tray 21 constituted as described above, the rotation supporting point thereof is provided at the upstream-side end portion of the discharge tray 170 with respect to the sheet discharging direction, so that the inclination angle θc of the second stacking surface YZ gradually approaches from θcmax toward the inclination angle θc in accordance with an increase in stacked sheet number. For that reason, when the stacked sheet number increases, the returning force caused to act on the sheets by the second stacking surface YZ decreases, and on the other hand, with a lowering of the second stacking surface YZ, a degree of the inclination of the sheets at a portion supported by the second stacking surface YZ becomes small. That is, attitude of a bundle of the sheets stacked on the discharge tray 170 is close to the horizontal surface and a lower surface position of the sheet bundle lowers. For that reason, as described later, even when the number of sheets stacked on the tray becomes large, it becomes possible to smoothly discharge the sheets.

Incidentally, the inclination angle θb in the downstream-side section 92 of the fixing tray 20 is set at an angle smaller than the inclination angle θa in the upstream-side section 91 and the maximum inclination angle (θcmax). This is because an excessive increase in occupied range of the discharge tray 170 with respect to the vertical direction is prevented, and in the case of this embodiment, a space for the second discharge tray 171 provided above the discharge tray 170 and sheets to be stacked thereon is ensured. In the downstream-side section 92 as a supporting portion, in the case where a long-sheet is discharged in the sheet discharging direction, the discharge tray supports a downstream-side portion of the long sheet above the second stacking surface YZ of the movable tray 21. Further, the inclination angle θb of the downstream-side section 92 is made a small value, so that as regards a relatively large sheet, it is possible to suppress that a feeding resisting force exerted on the sheet from the stacking surface during sheet discharging becomes large and thus improper discharge occurs. However, the reason why the inclination angle θb is not made 0 or less also in the downstream portion of the fixing tray 20 is that the returning force is exerted on the sheet even at any position of the discharge tray 170.

Incidentally, the fixing tray 20 and the movable tray 21 which constitute the first stacking surface WX and the second stacking surface YZ includes the ribs each extending in the sheet discharging direction, and particularly the second stacking surface is formed by the arcuate ribs 21*d*. Such ribs are effective for alleviating the feeding resistance exerted from the tray surface on the sheet while being discharged onto the discharge tray 170. Further, the second stacking surface YZ is curved so that the degree of the inclination becomes small toward the downstream side, so that irrespective of a rotation angle of the movable tray 21, it is possible to prevent generation of a large stepped portion or groove leading to catch of the sheet at a boundary between the second stacking surface YZ and the first stacking surface.

Further, the arcuate ribs 21*d* of the movable tray 21 project upward from the first stacking surface WX (i.e., project upward from the guiding ribs of the fixing tray 20) in a small amount in the neighborhood of the upstream end position Y of the second stacking surface YZ and in the neighborhood of the downstream end position Z of the second stacking surface YZ. By forming the arcuate ribs 21*d* at somewhat high level, it is possible to prevent a leading end and trailing end of the sheet with respect to the sheet discharging direction to be caught by longitudinal end portions of the surfaces 20*b* of the fixing tray 20. Further, a downstream end of each of the slits 20*b* with respect to the sheet discharging direction is formed in a tapered shape such that a shape thereof narrows toward the downstream side. By this, even if the movable tray 21 rotates downstream from the stand-by state and the sheet is newly discharged in a state in which the downstream end portion of each arcuate rib 21*d* is positioned below the associated slit 20*b*, the sheet can be prevented from being caught by the downstream end of the slit 20*b*.

Further, the first stacking surface WX is constituted by the upper surface of the fixing tray 20 which is a plate-like member expanding in the sheet discharging direction and the widthwise direction, and the second stacking surface YZ is constituted by a rib-like member which projects through the slit provided in the plate-like member and which extends in the sheet discharging direction. For this reason, most of openings of the slits 20*b* are closed by the arcuate ribs 21*d* when the movable tray 21 is in the stand-by state, and at least a part of the openings of the slits 20*b* is closed by the sheets when the movable tray 21 rotates downstream by a weight of the sheets. Accordingly, when the openings for moving the movable tray 21 upward and downward relative to the fixing tray 20, a possibility that a foreign matter falls on the back side of the discharge tray 170 can be suppressed.

Incidentally, the fixing tray 20 is provided with a removing groove 20*a* for permitting removal of the sheet therefrom. The removing groove 20*a* extends toward an end portion of the discharge tray 170 on one side (front side of the image forming apparatus) with respect to the widthwise direction D2. Further, the removing groove 20*a* is provided at an overlapping position with the movable tray 21 with respect to the sheet discharging direction D1, and is formed as a recessed-shape portion such that the upper surface 20*s* of the fixing tray 20 is recessed downstream. In order to allow a user to access the sheet(s) through the removing groove 20*a*, a part of the arcuate ribs 21*d* overlapping with the removing groove 20*a* at a position with respect to the widthwise direction D2 is formed only outside the removing groove 20*a* with respect to the sheet discharging direction D1. Incidentally, an inclination angle of a downstream-side wall surface of this removing groove 20*a* is also set at an angle capable of suppressing catch of the leading end of the sheet.

Further, each slit 20*b* provided in the fixing tray 20 has a minimum necessary length, and the fixing tray 20 is formed as a continuous member with respect to the widthwise direction D2 on each of the upstream and downstream sides relative to the movable tray 21. This not only has an advantage such that rigidity of the fixing tray 20 can be ensured but also has a shape taking flowability into consideration when the fixing tray 20 is prepared by injection molding of a resin material. An example of the resin material is PC+ABS (a copolymer of polycarbonate and acrylonitrile-butadiene-styrene resin). Incidentally, the fixing tray 20 may be a single member as a whole, and for example, may also be a combination of an upstream-side portion and a downstream-side portion which are molded as separate members.

[Operation of Movable Tray]

Figure 6:
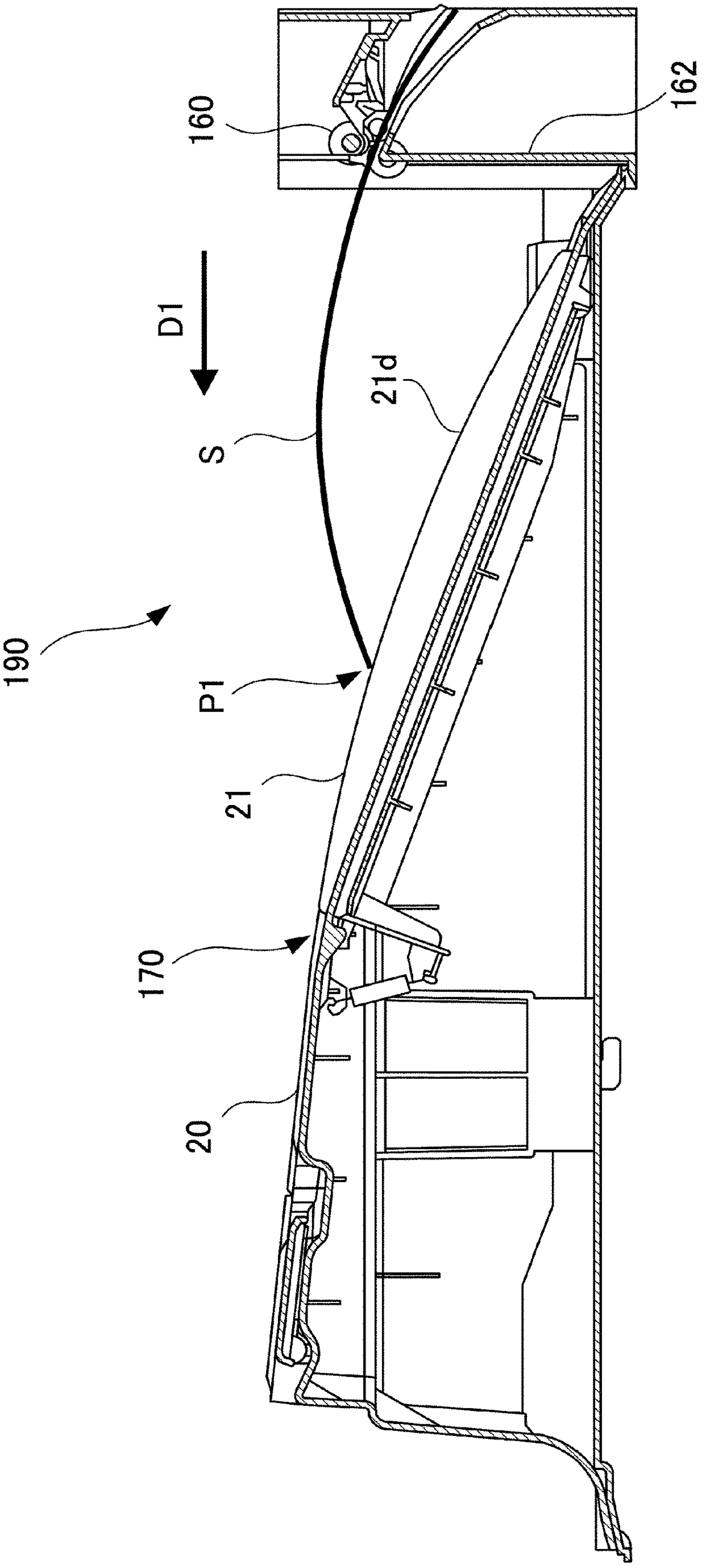
FIG. 6 is a sectional view showing a state of a sheet discharging operation in the embodiment 1.

A state of the discharge tray 170, constituted as described above, when the sheet is discharged on the stacking surface thereof will be described. FIG. 6 is a sectional view of the first discharging portion 190 showing a state during discharge of a first sheet S by the discharging roller 160, and FIG. 7 is a sectional view of the first discharging portion 190 showing a state in which the discharged first sheet S is aligned by the stacking surface of the discharge tray 170.

As shown in FIG. 6, the discharging roller 160 is constituted so as to discharge the sheet S in an attitude such that the sheet S is inclined upward toward the downstream side with respect to the sheet discharging direction D1 relative to the horizontal direction. In other words, the discharging roller 160 includes a roller pair disposed with a nip angle (an angle with respect to a direction perpendicular to a roller inter-axis direction when the roller pair sends the sheet from a nip thereof) where the sheet is discharged somewhat upward. Further, the discharging roller 160 is provided with a stiffness imparting member for imparting stiffness to the sheet S by curving (waving) the sheet S as seen from the downstream side of the sheet discharging direction D1. For that reason, the sheet S is discharged from a position, where the sheet S is nipped by the discharging roller 160, toward the downstream side of the sheet discharging direction D1 while drawing an arch-shaped locus toward the leading end thereof. This sheet S contacts the movable tray 21 of the discharge tray 170 being in the stand-by state at the leading end thereof in a position P1, and moves while sliding on the fixing tray 20 and the movable tray 21, and then the trailing end thereof is sent out by the discharging roller 160.

Figure 7:
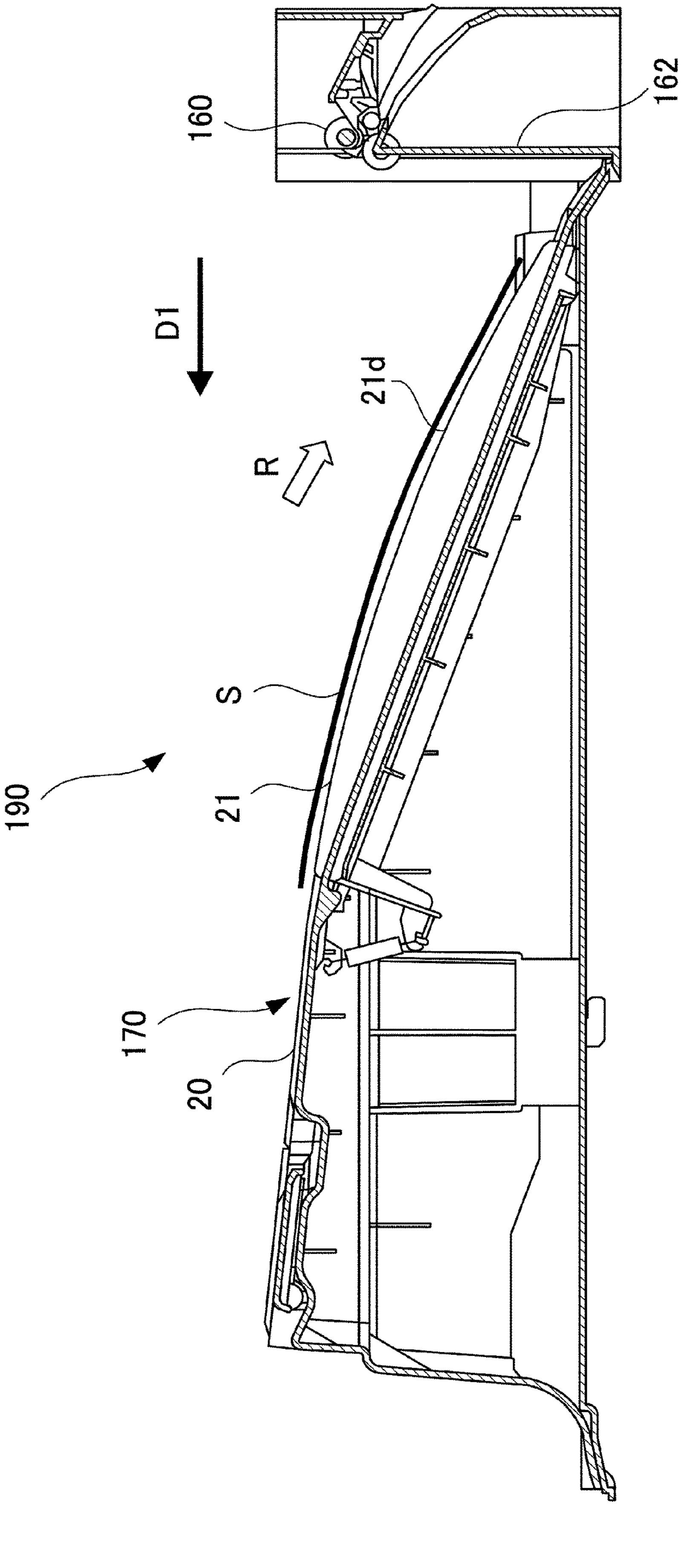
FIG. 7 is a sectional view showing motion of a sheet discharged on the discharge tray in the embodiment 1.

As shown in FIG. 7, the sheet S of which trailing end is sent out is returned toward the upstream side (arrow R) of the sheet discharging direction in accordance with a degree of inclination of the stacking surface of the discharge tray 170, particularly a degree of inclination of the stacking surface (second stacking surface) formed by the movable tray 21. Then, the sheet S is stopped by abutment of the trailing end of the sheet S with respect to the sheet discharging direction D1 against an aligning wall 162 provided on the apparatus main assembly 101. The aligning wall 162 is a reference surface on which a sheet position is aligned by contact thereof with the trailing end of the sheet S discharged on the discharge tray 170.

Behavior of the first sheet S when the first sheet S moves toward the aligning wall 162 is influenced by a magnitude of a frictional force acting between the sheet S and the stacking surface of the discharge tray 170. As regards a second sheet S, the influence of friction between the sheet S and the discharge tray 170 becomes small, and instead thereof, the influence between the sheets becomes large.

The above-described position P1 (a position where first contact of the leading end of the first sheet with the stacking surface of the discharge tray 170 is assumed) may preferably be a position spaced apart from the discharging roller 160 to some degree in the sheet discharging direction D1 and may preferable be at the substantially same level as a level of the nip of the discharging roller 160. Further, the movable tray 21 is formed so that the direction of the sheet S at the leading end portion and the contact angle of the sheet S with the second stacking surface are not excessively large. As regards the movable tray 21 in this embodiment, in the stand-by state, the degree of the inclination becomes moderate from the maximum inclination angle (32 degrees) at the upstream end toward the downstream side, and the inclination angle at the downstream end is substantially equal to the inclination angle (6 degrees) of the fixing tray 20 at the downstream portion. By employing such a constitution, the feeding resistance exerted from the stacking surface on the sheet S is suppressed and a maximum sheet number of sheets capable of being stacked on the discharge tray 170 is ensured, so that the sheets low in rigidity (stiffness) can be discharged stably and an aligning property of the stacked sheet is improved.

Figure 8:
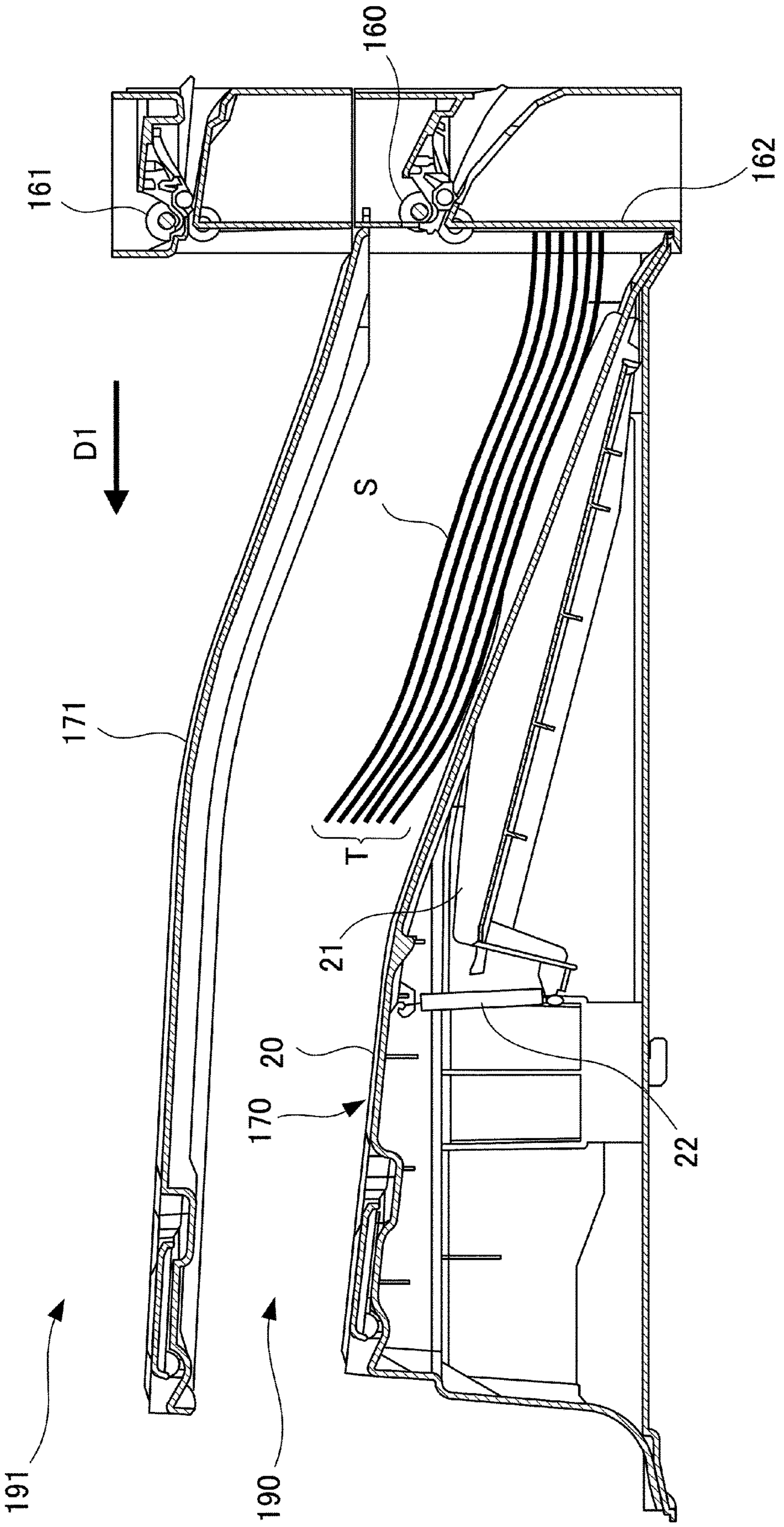
FIG. 8 is a sectional view showing a state in which a plurality of sheets are stacked in the embodiment 1.
Figure 9:
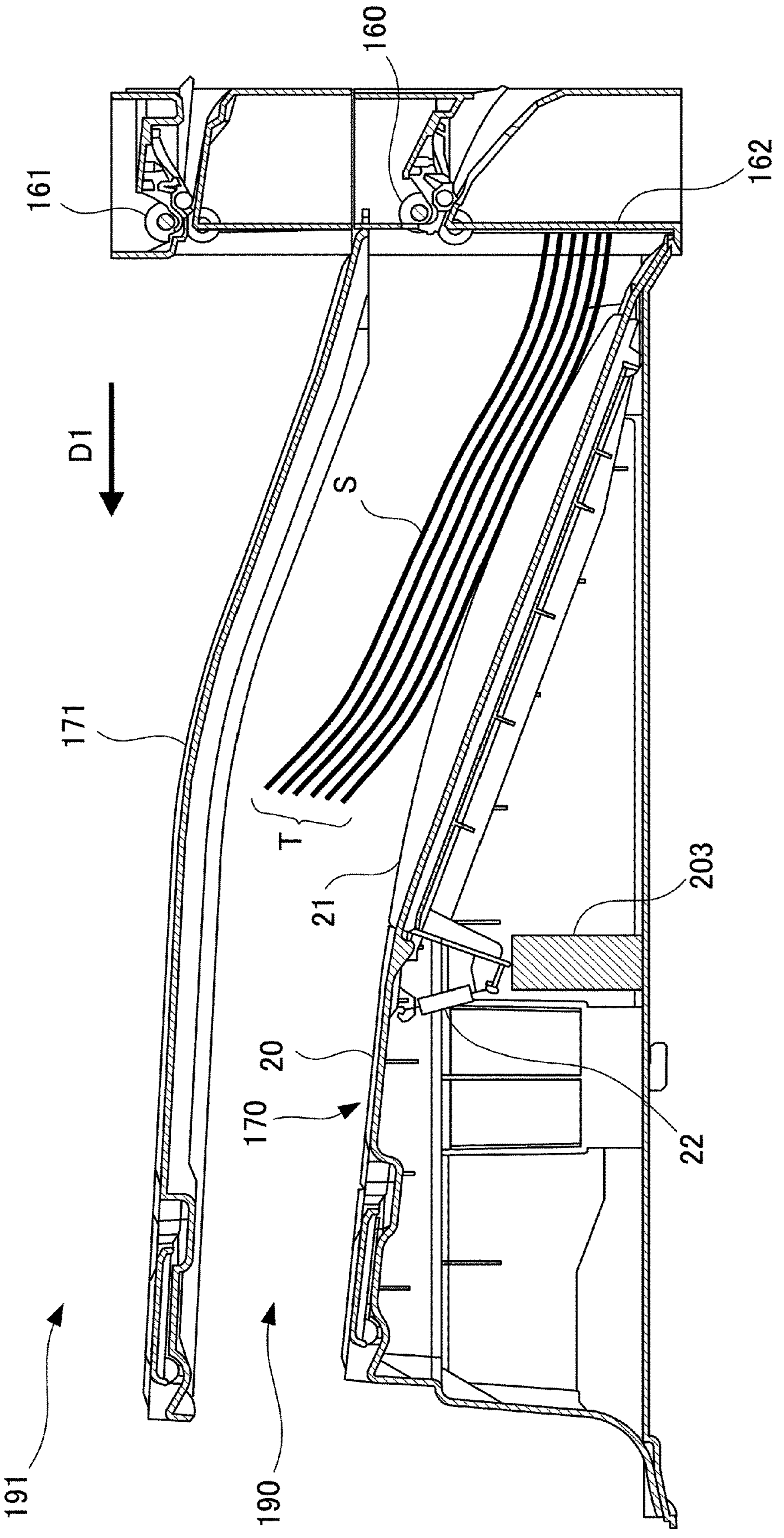
FIG. 9 is a sectional view showing a state in which a plurality of sheets are stacked in a comparison (reference) example.

Incidentally, the sheets discharged by the discharging roller 160 include sheets such as recycled paper and thin paper, and these sheets have a tendency that a degree of curve (curl) of a sheet end portion, for example, in a high-humidity environment becomes large. The case where such sheets with a large degree of curl are stacked in a relatively large amount will be described using FIGS. 8 and 9. FIG. 8 is a sectional view of the first discharging portion 190 and the second discharging portion 191, in which a state that a plurality of curled sheets are stacked on the discharge tray 170. FIG. 9 is a sectional view of the first discharging portion 190 and the second discharging portion 191, in which as a reference example, a state that the movable tray 21 is fixed at the position of the stand-by state. However, the number of the sheets illustrated in FIGS. 8 and 9 are not intended to specify an actual number of the sheets in this embodiment.

In the image forming apparatus of this embodiment, it is possible to use both a small-size sheet such as an A4-size sheet and a large-size sheet such as an A3-size sheet. In either size, curl occurs, but the curled sheet is raised at an end portion thereof correspondingly to a degree of curve (curvature). Particularly, compared with a large-size sheet, a small-size sheet is short, so that due to the curl, the sheet is liable to form an abruptly inclined surface. In addition, as described above, the stacking surface of the discharge tray 170 is constituted so that the inclination angle on the upstream side with respect to the sheet discharging direction is larger than the inclination angle on the downstream side with respect to the sheet discharging direction. The small-size sheet is supported principally by the upstream-side stacking surface with a larger degree of the inclination, so that the influence of the curl of the sheet is liable to appear by a synergistic effect with the inclination of the stacking surface.

In FIG. 8, the small-size sheets S are stacked in a curled state. In the case of the small-size sheets S, in a state in which the trailing ends of the sheets with respect to the sheet discharging direction D1 contact the aligning wall 162, the leading ends of the sheets are positioned on a side upstream of the downstream end of the movable tray 21. The sheets S are curled so that a lower surface which is an image surface (a surface opposing the stacking surface of the discharge tray 170) has a projected shape. For that reason, a stacked bundle T of the sheets S is contacted to and supported by the stacking surfaces of the fixing tray 20 and the movable tray 21 at a mid-slope portion, and on the other hand, the stacked bundle T is raised at an end portion with respect to the sheet discharging direction D1.

Here, by a weight of the stacked bundle T, the movable tray 21 is rotated downward from a position of the stand-by state (FIGS. 6 and 7), so that a part of the arcuate ribs of the movable tray 21 is retracted downward from the upper surface of the fixing tray 20 through the slits. Further, the degree of the inclination of the stacking surface formed by the movable tray 21 is also becomes moderate compared with that in the stand-by state. In other words, by an increase in stacking amount of the stacked bundle, at least a part of the second stacking surface is retracted downward from the first stacking surface, so that the degree of the inclination of the second stacking surface relative to the horizontal surface becomes small. For this reason, in the case where the discharged sheet S is curled, a situation such that a discharging space on the discharge tray 170 is occupied by the stacked bundle T consisting of the sheets S in a relatively small amount is avoided.

Incidentally, in the reference example shown in FIG. 9, the movable tray 21 is fixed at the position of the stand-by state by using a spacer 203, so that even when the weight of the stacked bundle T is increased, a height and inclination of the second stacking surface is unchanged. For that reason, in the case where the discharged sheets S are curled, the downstream ends of the sheets are raised, so that the discharging space on the discharge tray 170 is occupied by the stacked bundle T consisting of the sheets S in the relatively small amount.

In this case, a contact angle of the leading end of the sheet S discharged from the discharging roller 160 contacts the upper surface of the stacked bundle T becomes large compared with a state shown in FIG. 8 in which the movable tray 21 is rotated, with the result that the sheet S collides with the upper surface of the stacked bundle T and this is liable to receive a large force. Further, a feeding resistance when the sheet S is discharged while sliding on the upper surface of the stacked bundle T (particularly on the curled portion at the downstream portion of the stacked bundle T) becomes large. As a result, there is a possibility that a state in which the sheet S is not satisfactorily sent out of the discharging roller 160 and thus the trailing end of the sheet S remains in the nip of the discharging roller 160 and does not fall on the discharge tray 170 (trailing end leaning) occurs. Further, when a subsequent sheet reaches the discharging roller 160 in a state in which the trailing end of a current sheet remains in the neighborhood of the nip of the discharging roller 160, there is a possibility that the leading end of the subsequent sheet collides with the trailing end of the current sheet and thus the current sheet and the subsequent sheet are not properly discharged.

On the other hand, in this embodiment, the movable tray 21 is rotated about the rotation supporting point provided in the neighborhood of the upstream-side end portion of the discharge tray 170 as described above, so that a height of the upper surface of the stacked bundle T is lowered and thus not only the discharging space is ensured but also the degree of the inclination of the stacked bundle T of the sheets is made small. By this, compared with the reference example shown in FIG. 9, a resisting force received by the discharged sheet is reduced, so that occurrence of improper discharge is suppressed and thus it is possible to realize smooth discharge of the sheet.

Further, in this embodiment, the constitution of the in-body discharge type is employed, so that there is a limit of a height of the discharging space of the discharge tray 170. In such a case, the constitution in which the movable tray 21 rotates about the rotation supporting point provided in the neighborhood of the upstream-side end portion of the discharge tray 170 has an advantage such that the discharging space can be ensured. Particularly, in this embodiment, above the discharge tray 170 as the first stacking portion, the second discharge tray 171 as the second (another) discharging portion is provided, so that there is a large advantage that the discharging space can be ensured. In this embodiment, the gap (interval) M between the central five arcuate ribs 21*d* is narrow, so that the sheet with a small size with respect to the widthwise direction can be stably supported by the central arcuate rib 21*d*.

Embodiment 2

In an embodiment 2, instead of the constitution of the embodiment 1 in which the movable tray 21 is rotated by the weight of the sheets, a constitution example in which a driving source for driving and rotating the movable tray 21 is provided will be described. In the following, elements having constitutions and actions similar to those in the embodiment 1 are represented by the reference numerals or symbols common to the embodiments 1 and 2 and will be omitted from description.

Figure 10:
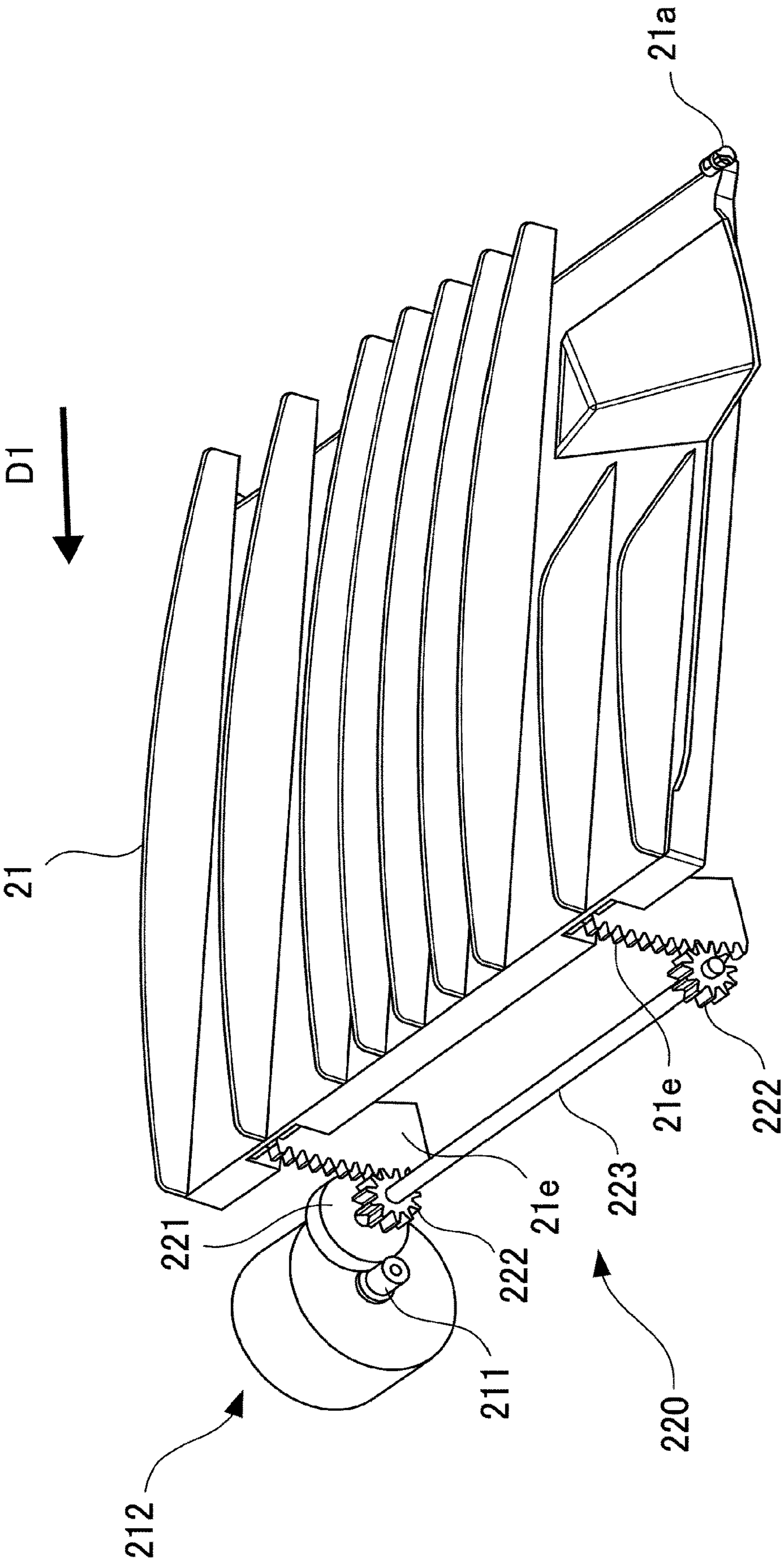
FIG. 10 is a perspective view of a movable tray in an embodiment 2.

FIG. 10 is a perspective view showing a movable tray 21 in this embodiment and a driving constitution thereof. The movable tray 21 is provided with sector gears 21*e* and 21*e* in two positions with respect to the widthwise direction at a downstream-side end portion opposite from the rotation shafts 21*a* with respect to the sheet discharging direction D1. The sector gears 21*e* and 21*e* are connected to an input/output shaft 220 through output gears 222 and 222. At an end portion of the input/output shaft 220, an input gear 221 engaging with a gear 211 of a rotation motor 212 which is the driving source is provided. Accordingly, by normal rotation and reverse rotation of the rotation motor 212, the movable tray 21 is driven through a gear train, so that the movable tray 21 is rotated upward and downward.

As this rotation motor 212, a stepping motor may suitably be used. In this case, a rotation amount of the movable tray 21, i.e., an inclination angle of the movable tray 21 can be set at an arbitrary value with high accuracy irrespective of the weight of the sheets on the tray. For this reason, depending on a condition such that for example, whether or not an environment is a high-humidity environment in which the curl of the sheet is liable to occur or whether or not the sheets are large in stacking height per (one) sheet, setting can be made so that the rotation amount of the movable tray 21 is different even in the case where the stacked sheet number of the sheets is the same. That is, it is possible to set a proper rotation amount depending on an operation condition of the image forming apparatus.

By using a sensor (for example, a switch for detecting that the movable tray 21 is in the position of the stand-by state) for detecting the position of the movable tray 21, the rotation amount of the movable tray 21 can be controlled with high accuracy. Further, above the movable tray 21, a sensor for detecting an upper surface height of the sheet bundle stacked on the discharge tray 170 is provided, and on the basis of a detection result thereof, the rotation amount of the movable tray 21 is controlled, so that the upper surface height of the sheet bundle can be accurately controlled.

Incidentally, in this embodiment, the rotation motor 212 is used as the driving source, and the movable tray 21 is rotated by a gear transmission mechanism shown in FIG. 10, but another driving constitution may also be used.

Modified Embodiments

In the above-described embodiments 1 and 2, description was made such that the inclined surface was constituted by the upper surface 20*s* of the fixing tray 20 and that the stacking surface was formed by the plurality of arcuate ribs 21*d* provided on the movable tray 21. However, a constitution in which the inclined surface is constituted by a plurality of rib-like members and in which the stacking surface is provided on a plate-like member including slits through which such rib-like members pass may also be employed.

Further, instead of the arcuate ribs 21*d*, ribs each having an upper end portion constituted by a curve other than the arcuate shape may also be provided. Also, in this case, the upper end portion of each rib may suitably be inclined upward toward the downstream side of the sheet discharging direction D1 in the stand-by state and may suitably be curved (including a portion bent in a zigzag shape) so that the inclination angle relative to the horizontal surface becomes small toward the downstream side of the sheet discharging direction D1.

Further, in this embodiment, the image forming apparatus including the image forming portion of the electrophotographic type was described, but the present invention is also effective in an image forming apparatus of another type. For example, also in an image forming apparatus including, as the image forming portion, a printing unit of an ink jet type, the case where curl of the sheet occurs with image formation exists, and therefore, the present invention is suitably applicable thereto.

As the image forming apparatus, an image forming apparatus including a sheet processing portion in which the sheet on which the image is formed by the image forming portion is received and then is subjected to punching, folding or the like may also be used.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-184744 filed on Oct. 7, 2019, which is hereby incorporated by reference herein in its entirety.

What is claimed is:

1. An image forming apparatus comprising:

an image forming portion configured to form an image on a sheet;

a discharging portion configured to discharge the sheet on which the image is formed by the image forming portion in a sheet discharging direction; and a stacking portion on which the sheet discharged by the discharging portion is stacked, wherein the stacking portion includes:

(1) a first member including an inclined surface inclined upward toward a downstream side of the sheet discharging direction, wherein the inclined surface of the first member includes a slit; and (2) a rib, wherein the discharged sheet is stacked on a stacking surface of the rib projected upward from the inclined surface through the slit, wherein the rib is movable with respect to the first member such that a projected amount of the rib from the inclined surface is changed, wherein the first member is provided with a groove portion recessed downward below the inclined surface and extending toward a sheet widthwise direction perpendicular to the sheet discharging direction in a region within a width of the discharged sheet with respect to the widthwise direction, and wherein the rib and the groove portion are overlapped with each other with respect to a position in the sheet discharging direction, and the rib is disposed such that a downstream end of the rib in the sheet discharging direction is positioned downstream of the groove portion in the sheet discharging direction.

2. An image forming apparatus according to claim 1, wherein the rib is rotatable about the supporting point, the supporting point being provided upstream of an intermediary position between an upstream end and a downstream end of the stacking portion with respect to the sheet discharging direction, and wherein a distance from the supporting point to the upstream end of the stacking portion with respect to the sheet discharging direction is shorter than a distance from the supporting point to the intermediary position of the stacking portion with respect to the sheet discharging direction.

3. An image forming apparatus according to claim 1, wherein in a state in which the sheet is not stacked on the stacking portion, the rib is inclined upstream toward the sheet discharging direction.

4. An image forming apparatus according to claim 1, wherein the first member includes a supporting portion capable of supporting the sheet on a side downstream of the rib with respect to the sheet discharging direction, and wherein the sheet is supported by the stacking surface of the rib and the supporting portion.

5. An image forming apparatus according to claim 4, wherein the supporting portion has a plurality of ribs on which the sheets are stacked.

6. An image forming apparatus according to claim 1, further comprising an alignment portion configured to align the sheet, the alignment portion being in contact with the upstream end of the sheet, stacked on the rib, with respect to the sheet discharging direction.

7. An image forming apparatus according to claim 1, further comprising an urging portion configured to urge the rib in a direction in which the rib moves upward.

8. An image forming apparatus according to claim 1, further comprising a driving motor configured to move the rib such that the projected amount of the rib from the inclined surface through the opening is changed.

9. An image forming apparatus according to claim 8, wherein the driving motor moves the rib to a position depending on an operation condition of the image forming apparatus.

10. An image forming apparatus according to claim 8, wherein even in a case in which a stacked sheet number of the sheets is the same, the driving motor moves the rib so as to differentiate the projected amount of the rib depending on an operation condition of the image forming apparatus.

11. An image forming apparatus according to claim 1, wherein the inclined surface of the first member is provided with another slit, wherein the image forming apparatus further comprises another rib projecting upward from the inclined surface of the first member through the another slit, wherein the discharged sheet is stacked on a stacking surface of the another rib, and wherein the rib and the another rib integrally move.

12. An image forming apparatus according to claim 1, further comprising an image reading apparatus provided above the stacking portion and configured to read image information from an original.

13. An image forming apparatus according to claim 12, further comprising:

another discharging portion configured to discharge the sheet on which the image is formed by the image forming portion; and another stacking portion provided above the stacking portion and below the image reading apparatus, the another stacking portion being configured to stack thereon the sheet discharged by the another discharging portion.

14. An image forming apparatus according to claim 12, wherein the first member includes a fixed rib contacting the sheet, wherein the fixed rib is configured to guide and support the discharged sheet, wherein in the sheet discharging direction, an upstream end of a region supporting the sheet by the rib is upstream of an upstream side quadrisection point when a range supporting the sheet by the first member with respect to the sheet discharging direction is divided into four equal parts, wherein in the sheet discharging direction, a downstream end of the region supporting the sheet by the rib is downstream of an intermediary position of the region supporting the sheet by the first member, wherein a distance from the downstream end of the region supporting the sheet by the rib to the downstream end of the region supporting the sheet by the first member in the sheet discharging direction is longer than a distance from the upstream end of the region supporting the sheet by the first member to the upstream end to the region supporting the sheet by the rib, wherein the image reading apparatus is disposed so as to be overlapped with the rib with respect to a position in a horizontal direction and overlapped with the fixed rib downstream of a downstream end of the rib with respect to the sheet discharging direction, wherein the rib and the fixed rib are disposed different positions with each other in the sheet widthwise direction perpendicular to the sheet discharging direction, wherein the rib and the fixed rib are disposed so as to be overlapped with each other with respect to the position in the sheet discharging direction, and wherein the fixed rib continues from an upstream side of a downstream end of the slit in the sheet discharging direction to downstream of the downstream end of the slit.

15. An image forming apparatus according to claim 1, wherein the first member includes a fixed rib, wherein the fixed rib is configured to guide and support the discharged sheet, wherein the fixed rib is overlapped with the rib with respect to the position in the sheet discharging direction, and wherein a downstream end of the fixed rib in the sheet discharging direction is positioned downstream of the groove portion in the sheet discharging direction.

16. An image forming apparatus according to claim 15, wherein the first member includes another rib extending in the sheet discharging direction and projecting upward, and wherein the fixed rib overlaps with the groove portion, the rib, and the another rib with respect to the sheet discharging direction.

17. An image forming apparatus according to claim 15, wherein in a state in which the rib most projects upward from the first inclined surface, a top of the rib is higher than a top of the fixed rib at a predetermined position in the sheet discharging direction.

18. An image forming apparatus according to claim 1, wherein the first member includes a supporting portion downstream of the inclined surface, of which an inclination angle relative to a horizontal surface is smaller than an inclination angle of the inclined surface, the supporting portion being configured to support the sheet, and wherein a rib of the first member is continuously provided from the inclined surface to the supporting portion in the sheet discharging direction.

19. An image forming apparatus according to claim 1, wherein the inclined surface of the first member is provided with another slit, wherein the rib is provided with a plate-like main body portion projecting upward therefrom and another rib projecting upward from the plate-like main body portion and projecting upward from the inclined surface through the another slit, wherein the rib and the another rib are connected by the plate-like main body such that the rib and the another rib integrally rotate, and wherein as viewed from above, the plate-like main body and the first member overlap each other, and the first member and the rib are disposed such that a part between the rib and the another rib of the plate-like main body with respect to the sheet widthwise direction is covered by the first member.

20. An image forming apparatus according to claim 1, wherein a distance from an upstream end of the stacking surface to an upstream end of the stacking portion with respect to the sheet discharging direction is smaller than a distance from the upstream end of the stacking surface to an intermediary position of the stacking portion with respect to the sheet discharging direction.

21. An image forming apparatus according to claim 1, wherein the first member includes a fixed rib, wherein the fixed rib is configured to guide and support the discharged sheet, wherein the fixed rib is overlapped with the rib with respect to position in the sheet discharging direction, and wherein the rib is overlapped with the groove portion with respect to the position in the sheet discharging direction.

22. An image forming apparatus according to claim 21, wherein the first member includes a supporting portion downstream of the inclined surface, of which an inclination angle relative to a horizontal surface is smaller than an inclination angle of the inclined surface, and configured to support the sheet, and wherein the fixed rib is continuously provided from the inclined surface to the supporting portion in the sheet discharging direction.

23. An image forming apparatus according to claim 1, wherein a downstream edge of the groove portion in the sheet discharging direction is inclined to the sheet widthwise direction so as be positioned downstream in the sheet discharging direction toward outside in the sheet widthwise direction.

24. An image forming apparatus according to claim 1, wherein the groove portion includes a bottom portion and an inclined portion connecting the bottom portion and the inclined surface, in the sheet discharging direction and is inclined upward toward downstream in the sheet discharging direction, and wherein an inclination angle of the inclined portion relative to a horizontal surface is greater than an inclination angle of the inclined surface to the horizontal surface.

25. An image forming apparatus according to claim 1, wherein the groove portion extends to an end of the first member in the sheet widthwise direction.

26. An image forming apparatus according to claim 1, wherein the first member includes a fixed rib contacting the sheet, wherein the rib is disposed so as to be overlapped with both the groove portion and the fixed rib with each other with respect to the position in the sheet discharging direction, and wherein the fixed rib is disposed so as to be overlapped with the groove portion with each other with respect to the position in the sheet widthwise direction.

27. An image forming apparatus according to claim 1, further comprising a motor configured to move the rib so as to change a projected amount of the rib from the inclined surface, wherein the motor is disposed downstream of the groove portion in the sheet discharging direction.

28. An image forming apparatus according to claim 1, further comprising a motor configured to move the rib so as to change a projected amount of the rib from the inclined surface, wherein the motor is disposed so that a gear of the motor is positioned downstream of the groove portion in the sheet discharging direction.

29. An image forming apparatus comprising:

an image forming portion configured to form an image on a sheet;

a discharging portion configured to discharge the sheet on which the image is formed by the image forming portion in a sheet discharging direction; and a stacking portion on which the sheet discharged by the discharging portion is stacked, wherein the stacking portion includes: (1) a first member including an inclined surface inclined upward toward a downstream side of the sheet discharging direction, wherein the inclined surface of the first member includes a slit; and (2) a rib, wherein the discharged sheet is stacked on a stacking surface of the rib projected upward from the inclined surface through the slit, wherein the rib is movable with respect to the first member such that a projected amount of the rib from the inclined surface is changed, wherein the first member is provided with a recessed portion recessed downward below the inclined surface and extending to an end of the first member in a sheet widthwise direction perpendicular to the sheet discharging direction, wherein the recessed portion and the sheet on the stacking portion are overlapped with each other as viewed from above, and wherein the rib and the recessed portion are overlapped with each other with respect to a position in the sheet discharging direction, and the rib is disposed such that a downstream end of the rib in the sheet discharging direction is positioned downstream of the recessed portion in the sheet discharging direction.

30. An image forming apparatus according to claim 29, further comprising a motor configured to move the rib so as to change a projected amount of the rib from the inclined surface, wherein the motor is disposed downstream of the recessed portion in the sheet discharging direction.

31. An image forming apparatus according to claim 29, further comprising a motor configured to move the rib so as to change a projected amount of the rib from the inclined surface, wherein the motor is disposed so that a gear of said motor is positioned downstream of the recessed portion in the sheet discharging direction.

32. An image forming apparatus comprising:

an image forming portion configured to form an image on a sheet;

a discharging portion configured to discharge the sheet on which the image is formed by the image forming portion in a sheet discharging direction; and a stacking portion on which the sheet discharged by the discharging portion is stacked, wherein the stacking portion includes: (1) a first member including an inclined surface inclined upward toward a downstream side of the sheet discharging direction, wherein the inclined surface of the first member includes a slit; and (2) a rib which is movable up and down, wherein the discharged sheet is stacked on a stacking surface of the rib projected upward from the inclined surface through the slit, wherein the first member is provided with a recessed portion which is recessed downward below the inclined surface and through which user removes the sheet on the first member, and wherein the rib and the recessed portion are overlapped with each other with respect to a position in the sheet discharging direction, and the rib is disposed such that a downstream end of the rib in the sheet discharging direction is positioned downstream of the recessed portion in the sheet discharging direction.

* * * * *